United States Patent
Stadelmeier et al.

(10) Patent No.: US 9,628,155 B2
(45) Date of Patent: *Apr. 18, 2017

(54) TRANSMIT POWER ALLOCATION FOR ADAPTIVE MULTI-CARRIER MULTIPLEXING MIMO SYSTEMS

(71) Applicant: Sony Corporation, Tokyo (JP)

(72) Inventors: Lothar Stadelmeier, Stuttgart (DE); Daniel Schneider, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,082

(22) Filed: Jun. 1, 2016

(65) Prior Publication Data

US 2016/0277076 A1    Sep. 22, 2016

Related U.S. Application Data

(63) Continuation of application No. 13/601,545, filed on Aug. 31, 2012, now Pat. No. 9,362,993, which is a
(Continued)

(30) Foreign Application Priority Data

Dec. 20, 2007    (EP) .................................... 07123861

(51) Int. Cl.
| | |
|---|---|
| *H04W 4/00* | (2009.01) |
| *H04B 7/04* | (2017.01) |
| *H04W 76/00* | (2009.01) |
| *H04W 88/08* | (2009.01) |
| *H04W 72/04* | (2009.01) |
| *H04B 7/0426* | (2017.01) |

(Continued)

(52) U.S. Cl.
CPC ............ *H04B 7/043* (2013.01); *H04B 7/0426* (2013.01); *H04L 27/2601* (2013.01);
(Continued)

(58) Field of Classification Search
None
See application file for complete search history.

(56) References Cited

U.S. PATENT DOCUMENTS

| | | |
|---|---|---|
| 7,764,742 B2 | 7/2010 | Brink |
| 7,885,344 B2 | 2/2011 | Nakayama |
| | (Continued) | |

OTHER PUBLICATIONS

Zukang Shen, et al., "Optimal Power Allocation in Multiuser OFDM Systems", Globecom'03, IEEE Global Telecommunications Conference, vol. 1, Dec. 1, 2003, pp. 337-341.
(Continued)

*Primary Examiner* — Willie J Daniel, Jr.
(74) *Attorney, Agent, or Firm* — Oblon, McClelland, Maier & Neustadt, L.L.P.

(57) ABSTRACT

The present invention relates to transmit power allocation in multi-carrier, multiplexing MIMO communication systems. The present invention especially relates to a MIMO communication device, a method of assigning transmit power to two or more communication channels and a software program product. A multiple-input-multiple-output, MIMO, communication device according to the present invention comprises a link controller adapted to assign transmit power to two or more transmission channels, each of said transmission channels having preassigned a portion of transmit power for each of a group of subcarriers, said link controller being further adapted to assign, for each subcarrier of said group of subcarriers, at least part of the preassigned transmit power portion of a transmission channel that is not used for transmitting information at the subcarrier, to one or more transmission channels that are used for transmitting information at the subcarrier.

20 Claims, 6 Drawing Sheets

Related U.S. Application Data continuation of application No. 12/275,728, filed on Nov. 21, 2008, now Pat. No. 9,042,310.

(51) Int. Cl.
- *H04W 52/24* (2009.01)
- *H04W 52/34* (2009.01)
- *H04L 27/26* (2006.01)

(52) U.S. Cl.
CPC ....... *H04W 52/241* (2013.01); *H04W 52/346* (2013.01); *H04W 72/04* (2013.01); *H04W 76/00* (2013.01); *H04W 88/08* (2013.01)

(56) References Cited

U.S. PATENT DOCUMENTS

| | | |
|---|---|---|
| 8,060,033 B2 | 11/2011 | Himayat et al. |
| 8,078,211 B2 | 12/2011 | Medvedev et al. |
| 8,270,507 B2 | 9/2012 | Schneider |
| 9,042,310 B2 | 5/2015 | Stadelmeier |
| 2004/0190636 A1 | 9/2004 | Oprea |
| 2005/0032514 A1 | 2/2005 | Sadri et al. |
| 2007/0223608 A1 | 9/2007 | Nakayama |
| 2008/0013610 A1 | 1/2008 | Varadarajan et al. |
| 2009/0052567 A1 | 2/2009 | Yang |
| 2010/0034219 A1 | 2/2010 | Stadelmeier |
| 2012/0320868 A1 | 12/2012 | Stadelmeier |

OTHER PUBLICATIONS

Office Action issued Feb. 29, 2012, in Chinese Patent Application No. 200810185379.2 with English translation.

Extended European Search Report issued Feb. 25, 2013 in Patent Application No. 12005822.7.

Extended European Search Report issued Feb. 25, 2013 in Patent Application No. 12005823.5.

Office Action issued Feb. 28, 2013 in European Patent Application No. 07 123 861.2

TRANSMIT POWER ALLOCATION FOR ADAPTIVE MULTI-CARRIER MULTIPLEXING MIMO SYSTEMS

CROSS-REFERENCE TO RELATED APPLICATION

This application is a continuation of U.S. application Ser. No. 13/601,545, filed Aug. 31, 2012, which is a continuation of U.S. application Ser. No. 12/275,728, filed Nov. 21, 2008, and claims priority under 35 U.S.C. §119 to European Application No. 07 123 861.2, filed Dec. 20, 2007, and the entire contents of each of which is hereby incorporated by reference.

FIELD OF THE PRESENT INVENTION

The present invention relates to transmit power allocation in multi-carrier, multiplexing MIMO communication systems. The present invention especially relates to a MIMO communication device, a method of assigning transmit power to two or more communication channels and a software program product.

DESCRIPTION OF THE STATE OF THE ART

Multiple-input-multiple-output (MIMO) communication systems use a plurality of transmit ports (e.g. transmit antennas) and receive ports (e.g. receive antennas). Multiplexing MIMO systems, which are also known as spatial multiplexing MIMO systems, split an incoming data stream on several transmission channels, resulting in an increased data rate. (Alternatively, a higher robustness may be obtained instead of a higher data rate.) In simple systems, the transmission channels may correspond to the transmit ports, in more complex systems an encoding (precoding) is applied by a multiplexing MIMO precoder in the transmitter which, typically, spreads the transmission channels over the transmission ports. A decoding (detection) corresponding to the encoding is applied by a multiplexing MIMO detector in the receiver in order to recover the transmission channels. An example of such encoding is Eigenbeamforming. Multi-carrier modulation schemes (e.g. OFDM or multi-carrier wavelet modulation) are using a plurality of subcarriers in order to transmit data. In adaptive multi-carrier communication systems the modulation scheme for each subcarrier is chosen based on a signal-to-noise ratio (SNR) of the subcarrier. Waterfilling is a known method for transmit power allocation which optimizes the overall throughput (data rate) while holding the overall transmit power below a maximum value. Waterfilling is efficient for non-adaptive multi-carrier systems (i.e. when all subcarriers are modulated in the same way). For adaptive multi-carrier systems, however, waterfilling shows almost no transmission throughput gain.

The problem to be solved by the present invention is to provide for a MIMO communication device and a method and a computer program product for assigning transmit power allowing for a higher data rate.

BRIEF DESCRIPTION OF THE PRESENT INVENTION

This problem is solved by a MIMO communication device according to claim 1 of the present invention, the method of assigning transmit power to two or more communication channels according to claim 10 of the present invention and the software program product according to claim 17 of the present invention.

The MIMO communication device according to the present invention comprises a link controller adapted to assign transmit power to two or more transmission channels, each of said transmission channels having preassigned a portion of transmit power for each of a group of subcarriers, said link controller being further adapted to assign, for each subcarrier of said group of subcarriers, at least part of the preassigned transmit power portion of a transmission channel that is not used for transmitting information at the subcarrier, to one or more transmission channels that are used for transmitting information at the subcarrier.

The MIMO communication device advantageously comprises a multiplexing MIMO detector, whereby said transmission channels correspond to output ports of the multiplexing MIMO detector.

Advantageously, said link controller is adapted to determine an indicator value of a signal-to-noise ratio, SNR, for each subcarrier of said group of subcarriers on each transmission channel and to determine, for each transmission channel and each subcarrier of said group of subcarriers, if the transmission channel is used for transmitting data at the subcarrier based on the corresponding indicator value of the SNR.

Advantageously, said link controller is adapted to determine for at least one subcarrier on at least one transmission channel an indicator value of an expected SNR, said indicator value of the expected SNR being based on the corresponding indicator value of the SNR and the corresponding assigned transmit power.

Advantageously, the MIMO communication device comprises a symbol demapper unit for demodulating received symbols, whereby the link controller is adapted to determine a demodulation scheme for each of said at least one subcarrier on said at least one transmission channel based on the corresponding indicator value of the expected SNR and to configure said symbol demapper unit with the determined demodulation schemes so that a symbol transmitted on a given one of said at least one subcarrier on said at least one transmission channel is demodulated with the corresponding determined demodulation scheme.

Alternatively to comprising a multiplexing MIMO detector, the MIMO communication device advantageously comprises a multiplexing MIMO precoder, whereby said transmission channels correspond to input ports of the multiplexing MIMO precoder.

Advantageously in this case, the MIMO communication device comprises a receiving unit adapted to receive notching information indicating which transmission channels are not used for transmitting information at which subcarriers, whereby the link controller is adapted to determine which transmission channels are not used to transmit information at which subcarriers based on the received notching information.

Advantageously, at least some of said transmission channels have preassigned the same transmit power portions for a given subcarrier of said group of subcarriers.

Advantageously, at least some subcarriers of said group of subcarriers have preassigned the same transmit power portions for a given transmission channel.

The method of assigning transmit power to two or more communication channels according to the present invention is a method wherein each of said communication channels has preassigned a portion of transmit power for each of a group of subcarriers and comprises a step of assigning, for each subcarrier of said group of subcarriers, at least part of the preassigned transmit power portion of a transmission channel that is not used for transmitting information at the subcarrier, to one or more transmission channels that are used for transmitting information at the subcarrier.

Advantageously, said communication channels correspond to input ports of a multiplexing MIMO precoder and/or output ports of a multiplexing MIMO detector.

Advantageously, the method further comprises steps of determining an indicator value of a signal-to-noise ratio, SNR, for each subcarrier of said group of subcarriers on each transmission channel, and determining, for each transmission channel and each subcarrier of said group of subcarriers, if the transmission channel is used for transmitting data at the subcarrier based on the corresponding indicator value of the SNR.

Advantageously, the method further comprises a step of determining for at least one subcarrier on at least one transmission channel an indicator value of an expected SNR, said indicator value of the expected SNR being based on the corresponding indicator value of the SNR and the corresponding assigned transmit power.

Advantageously, the method further comprises steps of determining a modulation scheme for each of said at least one subcarrier on said at least one transmission channel based on the corresponding indicator value of the expected SNR and modulating each given one of said at least one subcarrier on said at least one transmission channel with the corresponding determined modulation scheme.

Advantageously, at least some of said transmission channels have preassigned the same transmit power portions for a given subcarrier of said group of subcarriers.

Advantageously, at least some subcarriers of said group of subcarriers have preassigned the same transmit power portions for a given transmission channel.

The software program product according to the present is adapted to carry out the method according to the present invention when executed by one or more processing devices.

DESCRIPTION OF DETAILED EMBODIMENTS

The general idea of the present invention, which is to allocate transmit power that is preassigned to a subcarrier of a first transmission channel that is not used for transmitting data to one or more transmission channels that are used for transmitting data on this subcarrier, is now explained with reference to specific embodiments of the present invention.

The transmission channels of the present invention may directly correspond to transmit ports of a MIMO transmitter or may correspond to transmission channels (e.g. decoupled transmission channels obtained by Eigenbeamforming) obtained by a means of multiplexing MIMO precoding at the transmitter and corresponding decoding at the receiver.

Figure 1:
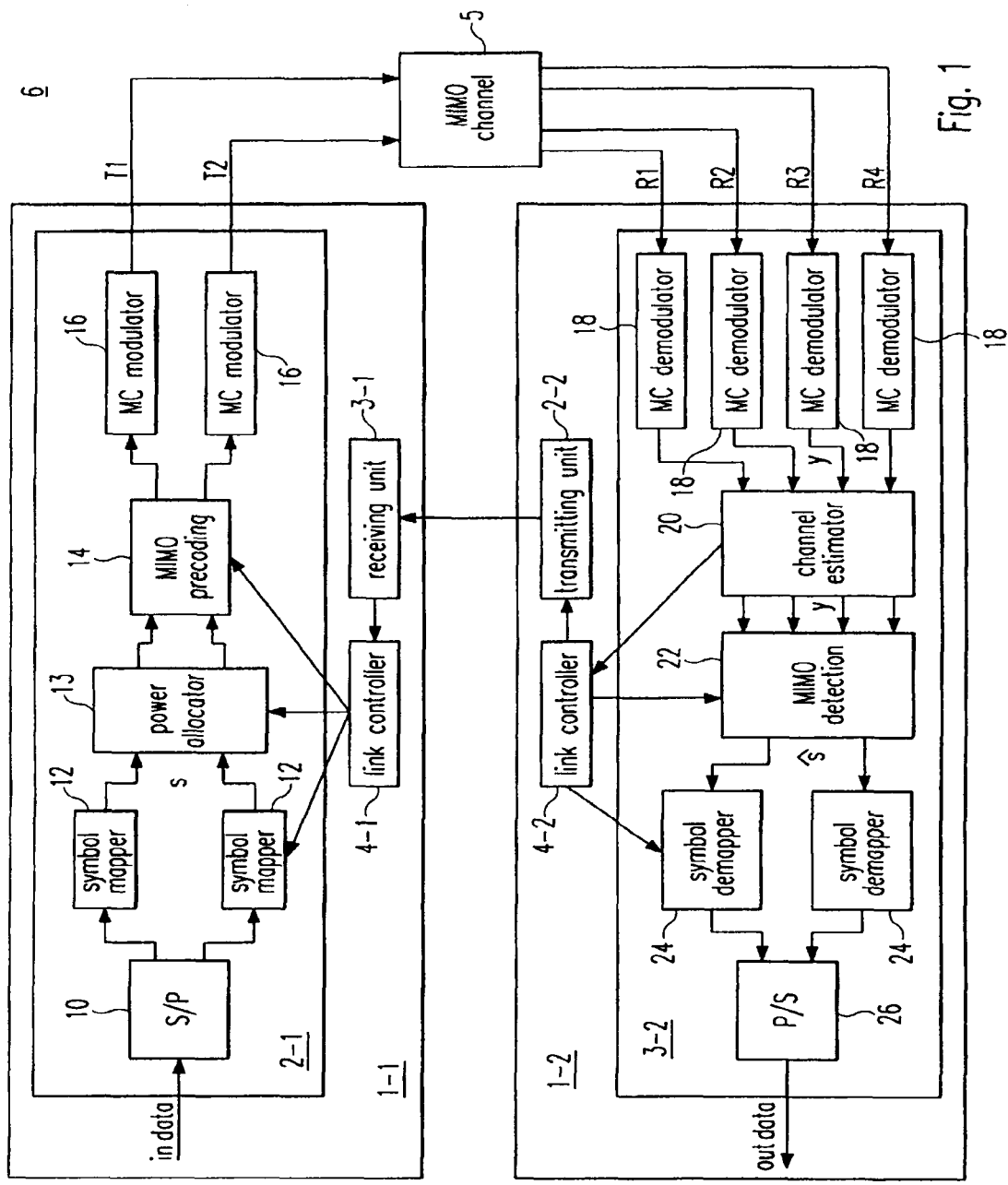
FIG. 1 shows a block diagram showing two communication devices according to an embodiment of the MIMO communication device according to the present invention.

FIG. 1 shows a communication system 6 comprising two communication devices 1-1, 1-2 according to an embodiment of the present invention. The communication device 1-1 comprises a transmitting unit 2-1, a receiving unit 3-1 and a link controller 4-1. The communication device 1-2 comprises a transmitting unit 2-2, a receiving unit 3-2, and a link controller 4-2. The communication devices 1-1 and 1-2 are identical. The communication devices 1-1, 1-2 may both operate as receiver and as transmitter. In the situation depicted in FIG. 1, the device 1-1 is in the role of the transmitter which transmits information (including user data) via the communication channel 5 to the communication device 1-2 which is in the role of the receiver. Because the devices 1-1 and 1-2 are the same, they comprise the same subunits (i.e. the transmitting units 2-1 and 2-2 are identical, the receiving units 3-1 and 3-2 are identical and the link controllers 4-1 and 4-2 are identical). Especially, the receiving unit 3-1 comprises the same subunits as are shown for the receiving unit 3-2 and the transmitting unit 2-2 comprises the same subunits as are shown for the transmitting unit 2-1. All operations the communication device 1-1 is adapted to perform, the communication device 1-2 is also adapted to perform and vice versa. Nevertheless, the communication device 1-2 according to the present invention may, be adapted to operate in the receiver mode only and comprise only the subunits required for operating in the receiver mode. When not referring to a special one of the communication devices 1-1 and 1-2 or to a subunit of the devices 1-1 and 1-2, the suffix "-2" and "-1" used to differentiate between the receiver and the transmitter may be dropped in the following.

The communication device 1, generally, may be any kind of multi-carrier, multiplexing MIMO communication device. Advantageously, it is an adaptive multi-carrier, multiplexing MIMO communication device, as is the communication device 1 according to the present embodiment. In adaptive multi-carrier, multiplexing MIMO communication systems, preferably each subcarrier on each transmission channel is modulated according to the SNR of the subcarrier on the transmission channel. However, not all subcarriers on all transmission channels are required to be modulated according to the SNR, at least some subcarriers on some transmission channels are modulated according to the SNR. For a relatively high SNR, a modulation scheme with a relatively high order is employed. For a relatively low SNR, a modulation scheme with a relatively low order is employed. For a very low SNR, the subcarrier on the transmission channel is not used for transmitting data (subcarrier on transmission channel is notched). The communication device 1 may be a wired (e.g. a PLC modem) or a wireless (e.g. an RF wireless) MIMO communication device. It may be a stationary (e.g. a WLAN base station) or a non-stationary (i.e. portable) (e.g. a mobile phone) communication device.

Now, transmission of data (including user data) from the transmitter 1-1 to the receiver 1-2 is explained.

The transmitting unit 2-1 comprises in the order of signal processing a serial-to-parallel converter (S/P) 10, symbol mappers 12, a power allocator 13, a MIMO precoder 14, and multi-carrier (MC) modulators 16. Therefore, the embodiment of the communication device according to the present invention is an adaptive multi-carrier communication device.

Figure 2:
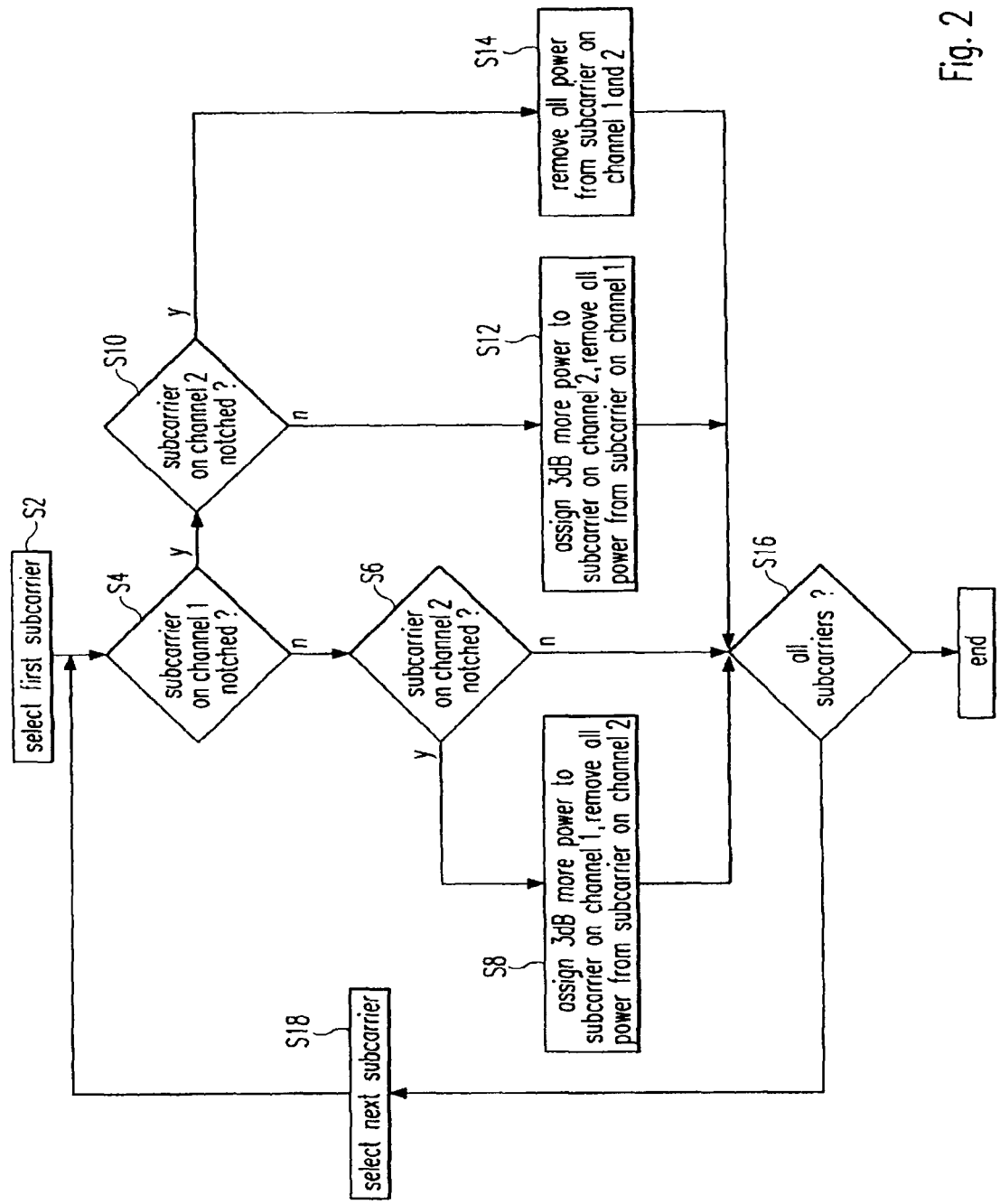
FIG. 2 shows a flow diagram corresponding to an embodiment of the method of assigning transmit power to two or more transmission channels according to the present invention.

The S/P 10 receives a stream of input data. The input data is given in the form of bits and may comprise user data. The S/P 10 converts (splits) the input data to a number N=>2 of parallel streams, the number N corresponding to the number of transmit paths T1, T2 and to the number of parallel and independent transmission channels (decoupled channels) obtained by means of precoding (e.g. Eigenbeamforming). In FIG. 2, N=2 holds. The splitting ratio depends on the available capacity (data rate) on each transmission channel. The operation of the S/P 10 is controlled by the link controller 4-1, based on the tonemaps described below.

Each symbol mapper 12 (e.g. QAM modulator 12) corresponds to one transmission channel (e.g. decoupled transmission channel) and performs a symbol mapping on the received data stream according to constellation information (constellation diagrams) provided by the link controller 4-1. Each subcarrier may be assigned a different constellation. The constellation information for the plurality subcarriers is also called a tonemap (e.g. OFDM tonemap). Each symbol mapper 12 uses a separate tonemap. Each symbol mapper 12 puts out one symbol for each subcarrier. The symbols put out by the plurality of symbol mappers 12 for a given subcarrier form a symbols vector s. The symbol vector s comprises N symbols (is of size N). One symbol vectors s is put out for each subcarrier. The operation of a symbol mapper 12 is also referred to as modulation and a constellation specifies (partly at least) a modulation scheme. The plurality of symbol mappers 12 form a symbol mapper unit 12. Thus, for each subcarrier, the transmission channels are modulated independently and independent symbols are (at least may be) transmitted on different transmission channels.

The power allocator 13 allocates transmission power to each of the decoupled transmission channels. The power allocator 13 is in the digital realm of the transmitting unit 2-1. Power allocation may be realized by multiplying the symbol transmitted on a given subcarrier of a given transmission channel with an amplification factor (e.g. a real positive value) which corresponds to the allocated transmit power. The power allocator 13 receives transmit power levels based on which the amplification factors can be determined from the link controller 4-1.

The MIMO precoder 14 precodes the symbol vectors s according to a multiplexing MIMO encoding method. The MIMO precoder 14 has input ports for receiving the symbol vector s and output ports for putting out the precoded vector. The input ports correspond to the transmission channels (e.g. decoupled transmission channels) and the output ports correspond to the transmit ports T1, T2 (i.e. a symbol that is put out from an output port of the MIMO precoder 14 is transmitted—after processing by the corresponding MC modulator 16—on a corresponding one of the transmit paths T1, T2). The MIMO precoder 14, for example an Eigenbeamforming precoder 14, precodes the symbol vector s and puts out a precoded vector of the same size N for each subcarrier. However, generally, precoding may be omitted, in this case the transmission channels correspond to the output ports T1, T2.

The link controller 4-1 receives the tonemaps (comprising notching information) to use for symbol mapping from the receiver 1-2 via the receiving unit 3-1.

In this embodiment it is assumed, that all information that is transmitted from the receiver 1-2 to the transmitter 1-1 is transmitted via the transmitting unit 2-2 and the receiving unit 3-1. The link controller 4-1 determines the transmit power levels based on the notching information as is described below. Alternatively or in addition to receiving notching information, the link controller 4-1 may receive the transmit power levels from the receiver 1-2. In this case, it need not calculate the transmit power levels based on the notching information. The notching information is regular part of the tonemaps, since the symbol mappers 12 must know which subcarrier is notched on which transmission channel.

Each MC modulator 16 (e.g. OFDM modulator 16) corresponds to one of the transmit paths (i.e. output ports) T1, T2, receives one symbol of the precoded vector and modulates (e.g. OFDM modulates) the received symbol so that it can be transmitted on the corresponding transmit path. In case of OFDM, each MC modulator 16 may, for example, but need not, comprise an IFFT, a DAC and an RF circuit (elements not shown) as is known in the art. Another example of a MC modulator 16 is a wavelet modulator 16. Other MC modulators 16 than OFDM modulators also may, but need not, comprise a DAC and an RF circuit.

The multi-carrier (MC) modulated symbols (symbol vectors) are transmitted via the MIMO transmission channel 5 to the receiver 1-2. For each subcarrier, the MIMO channel 5 is described by a separate channel state information (CSI).

The receiving unit 3-2 comprises in the order of signal processing MC demodulators 18, a channel estimator 20, a MIMO detector 22, symbol demappers 24 and a parallel-to-serial converter (P/S) 26.

Information corresponding to a transmitted MC modulated (e.g. OFDM modulated) symbol vector is received by the receiver 1-2 (the receiving unit 3-2) on a number M>=2 of receive paths R1, R2, R3, R4. In FIG. 1, M=4 holds. The received information forms an (MC modulated) received symbol vector of size M. Each MC demodulator 18 (e.g. OFDM demodulator 18) corresponds to one of the receive paths R1, R2, R3, R4, receives one symbol of the (MC modulated) received symbol vector and MC demodulates the received symbol according to a MC demodulation method. The MC demodulation method corresponds to the MC modulation method used in the transmitter 1-1. The MC demodulated symbols of each subcarrier form a received symbol vector y. In the case of OFDM, each demodulator 18 may, for example, but need not, comprise an RF circuit, an ADC and a FFT (elements not shown) as is known in the art. Another example of a MC demodulator 18 is a wavelet demodulator 18. Other MC demodulators 18 than OFDM demodulators also may, but need not, comprise an RF circuit and an ADC.

The channel estimator 20 is adapted to calculate channel state information (CSI) for each subcarrier. Channel estimation (i.e. calculation of the CSI) is based on signals transmitted from the transmitter 1-1 to the receiver 1-2 via the MIMO channel 5. The channel estimation techniques used may, for example, be based on OFDM training bursts and pilot symbols. Channel estimation, pilot symbols and OFDM training bursts are known in the art and will not be further described here. The channel estimator 20 provides the CSI to the link controller 4-2.

The link controller 4-2 determines the tonemaps to be used for transmission from the transmitter 1-1 to the receiver 1-2, provides the tonemaps to the symbol demappers 24 and transmits the tonemaps to the transmitter 1-1 via the transmitting unit 2-2. State of the art methods for obtaining the tonemaps may be used. For example, the link controller 4-2 may determine the modulation scheme that is to be used by a given subcarrier on a given transmission channel (e.g. decoupled transmission channel) based on the indicator value of the SNR of the given subcarrier on the given transmission channel. For a high SNR, a high order modulation scheme is chosen and for a low SNR, a low order modulation scheme is chosen. If the indicator value of the SNR is below a threshold value, the given subcarrier on the given transmission channel is not used for transmitting data. The given subcarrier on the given transmission channel is said to be notched. The information about notched subcarriers is part of the tonemaps. The link controller 4-2 may determine a multiplexing MIMO precoding method (e.g. an Eigenbeamforming precoding matrix) and transmit corresponding information (e.g. an index of an entry of a codebook comprising precoding matrices as entries) describing the precoding method to the transmitter 1-1 via the transmitting unit 2-2.

The MIMO detector 22 performs a detection on the received symbol vector y and obtains an estimate ŝ of the symbol vector s for each subcarrier based on the corresponding channel state information and the selected precoding method (e.g. precoding matrix). The MIMO detector 22 has input ports for receiving the received symbol vector y and output ports for putting out the detected estimate ŝ. The input ports correspond to the receive paths R1, R2, R3, R4 (i.e. a symbol that is received on one of the receive paths R1, R2, R3, R4 by the receiver 1-2 is input—after processing by the corresponding MC demodulator 16—to the MIMO detector 22 on a corresponding one of the input ports of the MIMO detector 22) and the output ports correspond to the (decoupled) transmission channels. Detection is also known as decoding, and the MIMO detector 22 may also be called a MIMO decoder 22. When expressed in terms of decoding, the MIMO decoder 22 decodes the received symbol vector y thereby obtaining the estimate ŝ of the symbol vector s which is comprised in the received symbol vector y in encoded form (s is encoded in y). The MIMO detector 22 may, for example, be a Zero Forcing (ZF) detector, a Minimum Mean Square Error (MMSE) detector and a Maximum Likelihood (ML) detector, but other detectors are possible too.

Each symbol demapper 24 (e.g. QAM demodulator 24) corresponds to one transmission channel and demaps (e.g. QAM demodulates) to the received symbols according to the tonemaps (constellation information) provided by the link controller 4-2. The symbol demapping operation corresponds to the symbol mapping operation in the corresponding symbol mapper 12 in the transmitter 1-1. The operation of a symbol demapper 24 is also known as demodulation. The plurality of symbol demappers 24 form a symbol demapping unit 24. After the symbol demapping unit 24, the information corresponding to the symbol vector ŝ for each subcarrier is provided in the form of bits.

The P/S 26 serializes the output bits of the symbol demappers 24 and provides them as a single stream of output data. When data transmission is successful, the output data is identical to the input data. However, it is not required that all bits are transmitted successfully, since error correction methods may be applied in the transmitter 1-1 and the receiver 1-2.

FIG. 2 shows a flow diagram of a first embodiment of the method of assigning transmit power to two or more communication channels. The method is carried out by the communication system 6. The two transmission channels have preassigned the same transmit power. When a transmission channel is not used for transmitting data, the preassigned transmission power is completely moved from the transmission channel to the other transmission channel. This corresponds to doubling the transmission power (i.e. a 3 dB increase of transmission power). The increase of transmission power leads to an increased SNR at the receiver 1-2. When the increase of transmission power and the SNR are expressed in dB (decibel), then the increase of the SNR is the same as the increase of the transmission power. Here, the SNR of the non-notched transmission channel is increased by 3 dB at the receiver 1-2.

In a step S2, a first subcarrier is selected. The method proceeds to a step S4.

In step S4, it is determined if the first transmission channel is notched at the selected subcarrier (i.e. it is determined if the selected subcarrier is not used for transmitting data on the first transmission channel). If yes, the method proceeds to a step S10. If no, the method proceeds to a step S6.

In step S6, it is determined if the second transmission channel is notched at the selected subcarrier (i.e. it is determined if the selected subcarrier is not used for transmitting data on the second transmission channel). If yes, the method proceeds to a step S8. If no, the method proceeds to a step S 16.

In step S8, the second transmission channel is assigned zero transmit power (the preassigned transmit power is removed completely) and the first transmission channel is assigned 3 dB more transmit power. Thereafter, the method proceeds to a step S 16.

In step S10, it is determined if the second transmission channel is notched at the selected subcarrier (i.e. it is determined if the selected subcarrier is not used for transmitting data on the second transmission channel). If yes, the method proceeds to a step S14. If no, the method proceeds to a step S 12.

In step S12, the first transmission channel is assigned zero transmit power (the preassigned transmit power is removed completely) and the second transmission channel is assigned 3 dB more transmit power. Thereafter, the method proceeds to a step S 16.

In step S14, the preassigned transmission power is removed completely from both transmission channels (the first transmission channel is assigned zero transmit power and the second transmission channel is assigned zero transmit power). Thereafter, the method proceeds to a step S16.

In step S16, it is determined if all subcarriers have already been considered (assigned/deassigned). If no, the method proceeds to a step S18, selects the next subcarrier, and returns to step S4. If no, assignment is complete and the method ends.

It must be noted, that the steps S10 and S14 are optional. When omitted, the method may directly proceed to step S12, if in step S4 the channel is determined to be notched. They are provided for explanation purpose and may be used for optional transmit power bookkeeping purposes.

Figure 3A:
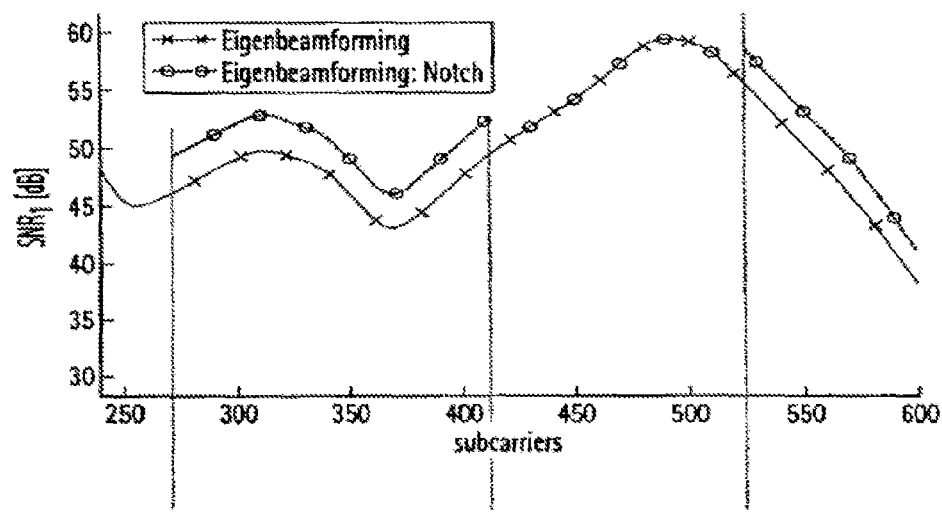
FIG. 3(a) shows a first example of a SNR increase obtained by the embodiment of the method of assigning transmit power according to the present invention.
Figure 3B:
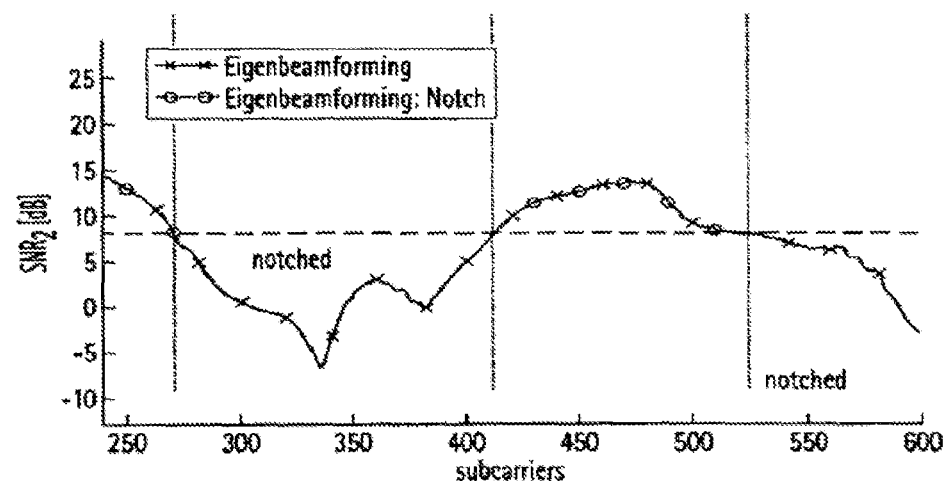
FIG. 3(b) shows a second example of a SNR increase obtained by the embodiment of the method of assigning transmit power according to the present invention.

FIGS. 3(a) and 3(b) show examples of the increase of SNR according to the above method. FIG. 3(a) shows the SNR of a first transmission channel obtained by Eigenbeamforming. FIG. 3(b) shows the SNR of second transmission channel obtained by Eigenbeamforming. It is typical that the one transmission channel obtained by Eigenbeamforming is much stronger than the other transmission channels. It can be seen that in regions where the second transmission channel is notched, the SNR of the first transmission channel is increased by 3 dB when compared to classical Eigenbeamforming. A combination of Eigenbeamforming with waterfilling (no SNR curve is shown for this combination) yields approximately the same SNR as pure Eigenbeamforming. Because the SNR is increased, the channel capacity is increased. Therefore, the data rate can be increased. The data rate can be increased, for example, by selecting a modulation scheme of a higher modulation order than would be possible without the increased SNR and/or by selecting an error correction scheme with less encoding overhead (i.e. with a smaller ratio of encoded to unencoded bits).

In case more than two transmission channels are present, the power of the notched transmission channel(s) may, for example, be assigned equally to the non-notched transmission channels. Generally (i.e. in case of two or more transmission channels), it is advantageous when all power of a notched transmission channel is assigned to the non-notched transmission channels, since this provides for the maximum increase of the SNR. After all notched channels have been considered, the non-notched transmission channels have assigned an overall transmit power which is given by the sum of the preassigned transmit power and the additional transmit power assigned to the channel. Of course, all declarations of this paragraph are relative to a given (selected) subcarrier. For example, advantageously, all power of a notched subcarrier on a transmission channel is assigned to the corresponding non-notched subcarriers (of same frequency) on the other transmission channels. When a non-notched transmission channel is assigned transmit power, it is assigned to the same subcarrier of the transmission channel as the subcarrier of the transmission channel from which the transmit power is taken away.

Because the power allocator 13 applies an amplification corresponding to the assigned transmit power, it is obvious that the transmitter 1-1 must know about the determined transmit power levels. However, there exist communication schemes, where the receiver 1-2 must also know about the assigned transmit power levels. For example, when the channel estimation is performed based on training symbols that are transmitted with a predefined transmit power (e.g. the preassigned transmit power), (which possibly is different from transmit power levels applied later for data symbols), the receiver 1-2 must know about the transmit power levels in order to correctly decode data symbols (at least when an amplitude based modulation method is employed). Also, in case the receiver 1-2 determines tonemaps, it is advantageous when the receiver 1-2 knows about the transmit power levels.

Thus, in an embodiment, the above method (steps S2 to S18) is executed in the receiver 1-2 and in the transmitter 1-1.

Figure 4:
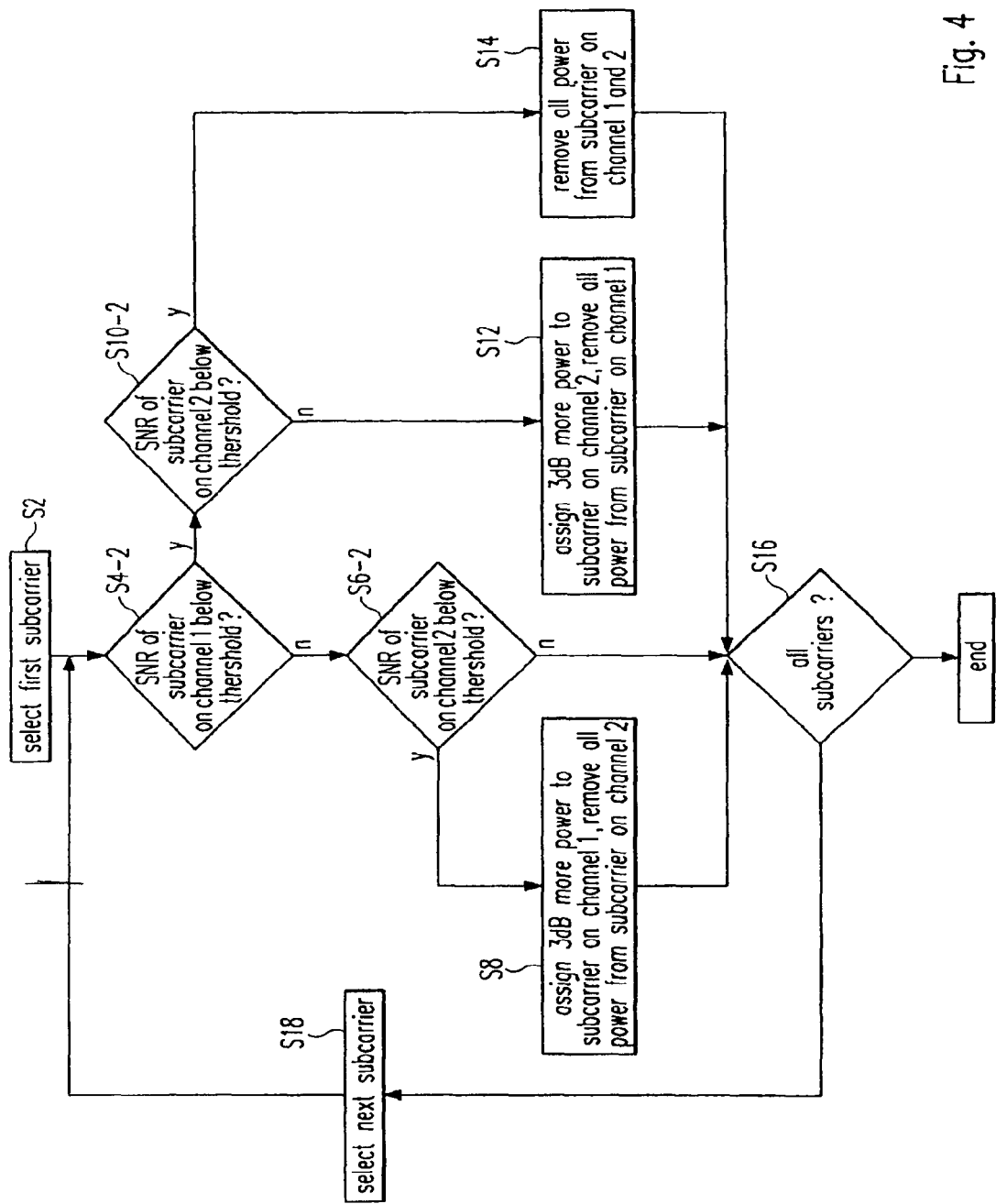
FIG. 4 shows a first realization of the embodiment of the method of assigning transmit power according to the present invention when executed in a receiver.

When executed in the receiver 1-2, the method may be executed by the link controller 4-2. FIG. 4 shows a method corresponding to a possible realization of the method of FIG. 2, when executed in the receiver 1-2. The method of FIG. 4 is the same as the method of FIG. 2, except that steps S4, S6 and S10 are replaced (realized) by steps S4-2, S6-2 and S10-2, respectively. Description of the other steps is therefore omitted.

In the step S4-2, it is determined if the SNR of the selected subcarrier on the first transmission channel is below a threshold. If yes, the first transmission channel is determined to be notched (at the selected subcarrier) and the method proceeds to step S10-2. If no, the first subcarrier is determined not to be notched (at the selected subcarrier) and the method proceeds to step S6-2.

In the step S6-2, it is determined if the SNR of the selected subcarrier on the second transmission channel is below a threshold. If yes, the second transmission channel is determined to be notched (at the selected subcarrier) and the method proceeds to step S8. If no, the second transmission channel is determined not to be notched (at the selected subcarrier) and the method proceeds to step S16.

In the step S10-2, it is determined if the SNR of the selected subcarrier on the second transmission channel is below a threshold. If yes, the second transmission channel is determined to be notched (at the selected subcarrier) and the method proceeds to step S14. If no, the second transmission channel is determined not to be notched (at the selected subcarrier) and the method proceeds to step S12.

It is noted that it is equivalent to say "a subcarrier is notched on a transmission channel", "a subcarrier on a transmission channel is notched" and "a transmission channel is notched at a subcarrier".

For the above determination if the SNR is below a threshold, an indicator value of the SNR may be used. It depends on the definition of the indicator value of the SNR, if an indicator value of the SNR that is above a threshold or an indicator value of the SNR that is below a threshold correspond to a SNR that is below a threshold.

Determination of notched subcarriers is part of the determination of the tonemap for each transmission channel executed by the link controller 4-2. The tonemaps comprise the notching information indicating which subcarrier is notched on which transmission channel. The link controller 4-2 transmits the tonemaps via the transmitting unit 2-2 to the transmitter 1-1. The link controller 4-1 receives the tonemaps via the receiving unit 3-1 and calculates the transmit power levels according to the above method (steps S2 to S18) of FIG. 2.

Figure 5:
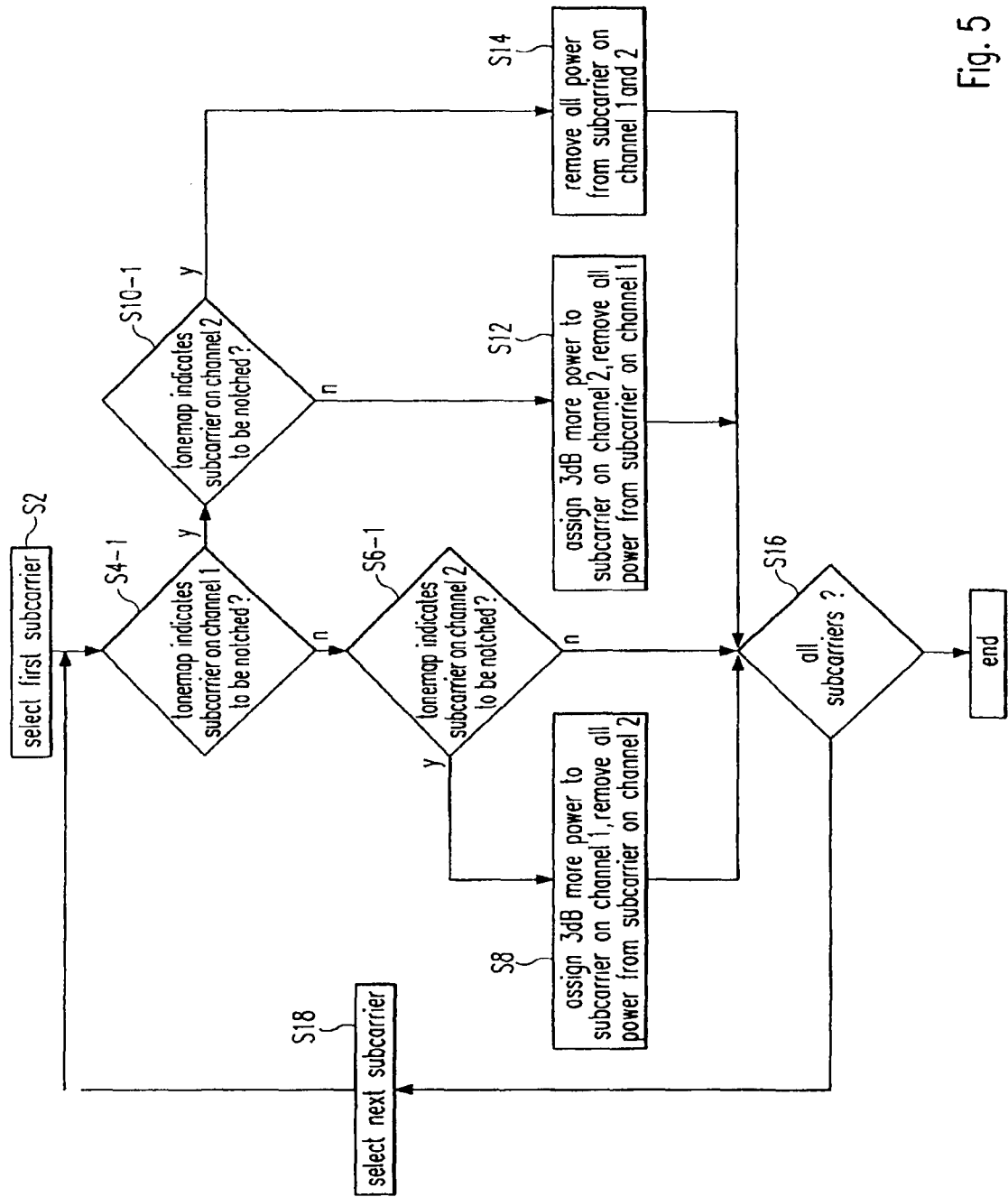
FIG. 5 shows a second realization of the embodiment of the method of assigning transmit power according to the present invention when executed in a transmitter.

FIG. 5 shows a method corresponding to a possible realization of the method of FIG. 2, when executed in the transmitter 1-1. The method of FIG. 5 is the same as the method of FIG. 2, except that steps S4, S6 and S10 are replaced (realized) by steps S4-1, S6-1 and S10-1, respectively. Description of the other steps is therefore omitted.

In step S4-1, it is determined if the tonemap (notching information) of the first transmission channel indicates the selected subcarrier to be notched. If yes, the first transmission channel is determined to be notched (at the selected subcarrier) and the method proceeds to step S10-1. If no, the first transmission channel is determined not to be notched (at the selected subcarrier) and the method proceeds to step S6-1.

In step S6-1, it is determined if the tonemap (notching information) of the second transmission channel indicates the selected subcarrier to be notched. If yes, the second transmission channel is determined to be notched (at the selected subcarrier) and the method proceeds to step S8. If no, the second transmission channel is determined not to be notched (at the selected subcarrier) and the method proceeds to step S16.

In step S10-1, it is determined if the tonemap (notching information) of the second transmission channel indicates the selected subcarrier to be notched. If yes, the second transmission channel is determined to be notched (at the selected subcarrier) and the method proceeds to step S14. If no, the second transmission channel is determined not to be notched (at the selected subcarrier) and the method proceeds to step S12.

Thus, when the method is executed in the transmitter 1-1, it is determined in each of the steps S4, S6 and S10 if the tonemap (notching information) of the given transmission channel indicates the given subcarrier to be notched. If yes, the transmission channel is determined to be notched (at the given subcarrier). If no, the transmission channel is determined not to be notched (at the given subcarrier).

Figure 6:
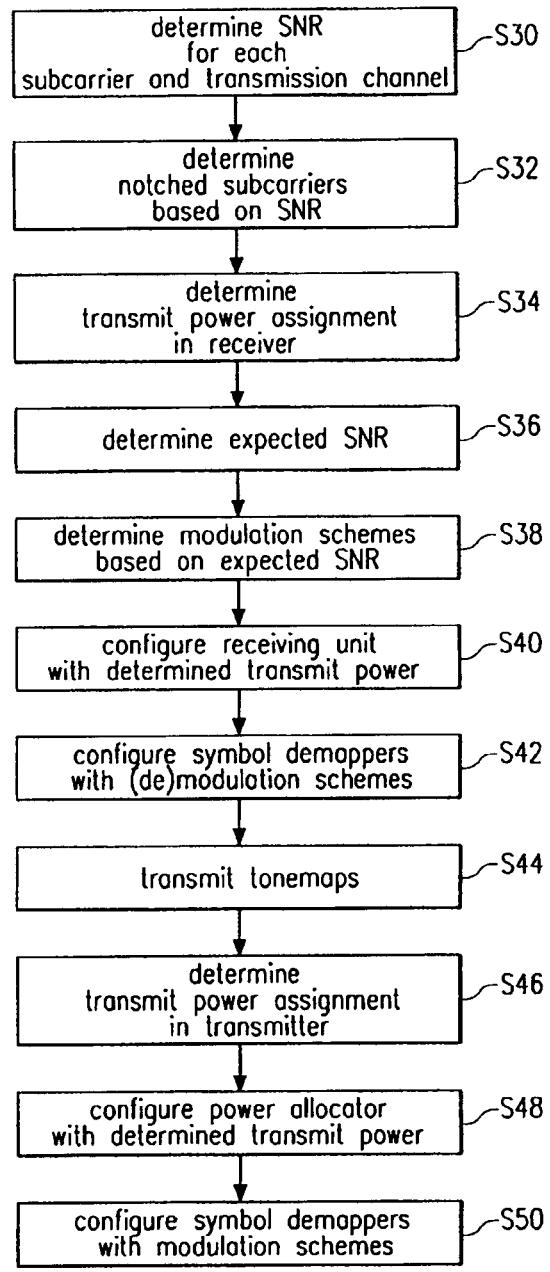
FIG. 6 shows a flow diagram of a further embodiment of the method of assigning transmit power to two or more transmission channels according to the present invention.

A flow diagram incorporating the above teaching is given in FIG. 6. The flow diagram corresponds to a further embodiment of the method of assigning transmit power to two or more communication channels according to the present invention.

In a step S30, an indicator value of the SNR is determined for each subcarrier of each transmission channel by the receiver 1-2 (e.g. the link controller 4-2). Determination of the indicator value of the SNR is based on one or more signals received by the receiver 1-2 from the transmitter 1-1. The link controller may hereby make use of the CSI provided by the channel estimator 20.

In steps S32 and S34, the link controller 4-2 determines the notched subcarriers on each transmission channel based on the determined indicator values of the SNR and determines the transmit power level (at least the additional transmit power) for each subcarrier on each transmission channel. Steps S32 and S34 may be realized by executing the method of FIG. 4 (receiver case).

In a step S36, the link controller 4-2 determines an indicator value of an expected SNR for each (non-notched) subcarrier on each transmission channel based on the corresponding indicator value of the SNR determined in step S30 and the corresponding transmit power level (additional transmit power). When the values are expressed in dB (dezibel), the expected SNR is the sum of the SNR and the additionally assigned transmit power. In the example given above, the expected SNR is 3 dB higher than the SNR (in case additional power has been assigned).

In a step S38, the link controller 4-2 determines a tonemap for each transmission channel based on the respective indicator values of the expected SNR. Notched subcarriers are indicated in the tonemaps.

In a step S40, the link controller 4-2 configures the receiving unit 3-2 (e.g. the MIMO detector 22 and/or the symbol demappers 24) so as to process signals received from the transmitter 1-1 based on the determined transmit power levels.

In a step S42, the link controller 4-2 configures the symbol demappers 24 with the respective tonemaps, so as to apply the correct demodulation for received signals.

In a step S44, the link controller 4-2 transmits the tonemaps to the transmitter 1-1 via the transmitting unit 2-2. The link controller 4-1 receives the tonemaps via the receiving unit 3-1.

In a step S46, the link controller 4-1 determines the transmit power levels for each (non-notched) subcarrier on each transmission channel based on the received tonemaps. This step may be realized by executing the method of FIG. 5 (transmitter case).

In a step S48, the link controller 4-1 configures the power allocator 13 so as to apply the determined transmit power levels.

In a step S50, the link controller 4-1 configures the symbol mappers 12 with the respective tonemaps, so as to apply the determined modulation scheme for each subcarrier and transmission channel.

In an alternative embodiment, the link controller 4-2 transmits the calculated transmit power levels via the transmitting unit 2-2 to the transmitter 1-1. The power allocator 13 then applies the received transmit power levels.

The invention claimed is:

1. A method of assigning transmit power in a multiple-input-multiple-output (MIMO) two-stream transmission, the method comprising:

receiving a first symbol stream associated with a plurality of subcarriers in accordance with constellation information contained in a first tonemap, the first tonemap including first information indicating subcarriers of the plurality of subcarriers that are not used for transmitting data;

receiving a second symbol stream associated with the plurality of subcarriers in accordance with constellation information in a second tone map, the second tonemap including second information indicating subcarriers of the plurality of subcarriers that are not used for transmitting data;

reallocating, by the circuitry according to the first tonemap when a subcarrier for the first symbol stream is not used for transmitting data and the corresponding subcarrier for the second symbol stream is used for transmitting data, all of the transmit power of the subcarrier of the first symbol stream to the corresponding subcarrier of the second symbol stream; and reallocating, by the circuitry according to the second tonemap when a corresponding subcarrier for the second symbol stream is not used for transmitting data and the subcarrier for the first symbol stream is used for transmitting data, all of the transmit power of the subcarrier of the second symbol stream to the subcarrier of the first symbol stream.

2. The method according to claim 1, wherein after the reallocating of all of the transmit power to the first symbol stream or the second symbol stream, respectively, the transmit power for the first symbol stream or the second symbol stream is 3 dB more than the transmit power for the corresponding symbol stream.

3. The method according to claim 1, wherein for each of the plurality of subcarriers, when the first and second tonemaps of one of the first and second symbol streams is not used for transmitting information at the subcarrier and the other one of the first and second symbol streams is used for transmitting information at the subcarrier, a preassigned transmit power portion for the one of the first and second symbol streams that is not used for transmitting information at the subcarrier is assigned to the other one of the first and second symbol streams which is used for transmitting information at the subcarrier.

4. The method according to claim 1, wherein the reallocating of the transmit power includes multiplying a symbol of the first or second symbol stream, respectively, with an amplification factor corresponding to the allocated transmit power.

5. The method according to claim 1, wherein the MIMO two-stream transmission is a power-line communication (PLC) MIMO two-stream transmission.

6. The method according to claim 1, wherein the circuitry determines whether the subcarrier of the first symbol stream is used to transmit data according to a signal-to-noise ratio of the subcarrier of the first symbol stream.

7. The method according to claim 1, wherein the circuitry determines whether the subcarrier of the second symbol stream is used to transmit data according to a signal-to-noise ratio of the subcarrier of the second symbol stream.

8. The method according to claim 1, wherein the circuitry determines whether the subcarrier of the first symbol stream is used to transmit data by comparing a signal-to-noise ratio of the subcarrier of the first symbol stream to a predetermined threshold.

9. The method according to claim 1, further comprising:
receiving each of the first and second tonemaps.

10. The method according to claim 1, further comprising:
receiving a third symbol stream associated with the plurality of subcarriers in accordance with constellation information contained in a third tonemap, the third tonemap including third information indicating subcarriers of the plurality of subcarriers that are not used for transmitting data;
determining, by the circuitry utilizing the third information, whether a subcarrier of the third symbol stream is used for transmitting data; and
reallocating, by the circuitry according to the third tonemap, when the subcarrier of the third symbol stream is not used for transmitting data, the subcarrier for the first symbol stream is not used for transmitting data and the corresponding subcarrier for the second symbol stream is used for transmitting data, all of the transmit power of the subcarrier of the first symbol stream and all of the transmit power of the subcarrier of the third symbol stream to the corresponding subcarrier of the second symbol stream.

11. A multiple-input-multiple-output (MIMO) communication device, comprising:
a first symbol mapper circuit configured to receive a first data stream, perform a symbol mapping on the first data stream according to a first tone map for a plurality of subcarriers, and output a first symbol stream, the first tonemap including first information indicating subcarriers of the plurality of subcarriers that are not used for transmitting data;
a second symbol mapper circuit configured to receive a second data stream, perform a symbol mapping on the second data stream according to a second tone map for the plurality of subcarriers and output a second symbol stream, the second tonemap including second information indicating subcarriers of the plurality of subcarriers that are not used for transmitting data; and
a power allocation circuit configured to
receive the first and second symbol streams,
reallocate according to the first tonemap, when a subcarrier for the first symbol stream is not used for transmitting data and the corresponding subcarrier for the second symbol stream is used for transmitting data, all of the transmit power of the subcarrier of the first symbol stream to the corresponding subcarrier of the second symbol stream, and
reallocate according to the second tonemap, when a corresponding subcarrier for the second symbol stream is not used for transmitting data and the subcarrier for the first symbol stream is used for transmitting data, all of the transmit power of the subcarrier of the second symbol stream to the subcarrier of the first symbol stream.

12. The MIMO communication device according to claim 11, wherein the reallocation of the transmit power for the symbol stream that is not used for transmitting information at the subcarrier to the one of the first and second symbol streams which is used for transmitting information at the subcarrier increases the transmit power of that symbol stream is by 3 dB.

13. The MIMO communication device according to claim 11, wherein the power allocation circuit is further configured to assign, for each of the plurality of subcarriers when the first and second tonemaps of one of the first and second symbol streams is not used for transmitting information at the subcarrier and the other one of the first and second symbol streams is used for transmitting information at the subcarrier, a preassigned transmit power portion for the one of the first and second symbol streams that is not used for transmitting information at the subcarrier to the other one of the first and second symbol streams which is used for transmitting information at the subcarrier.

14. The MIMO communication device according to claim 11, wherein the power allocation circuit is further configured to multiply a symbol of the first or second symbol stream, respectively, with an amplification factor corresponding to the allocated transmit power.

15. The MIMO communication device according to claim 11, wherein the MIMO communication device is a power-line communication (PLC) MIMO communication device.

16. The MIMO communication device according to claim 11, wherein the power allocation circuit determines whether the subcarrier of the first symbol stream is used to transmit data according to a signal-to-noise ratio of the subcarrier of the first symbol stream.

17. The MIMO communication device according to claim 11, wherein the power allocation circuit determines whether the subcarrier of the second symbol stream is used to transmit data according to a signal-to-noise ratio of the subcarrier of the second symbol stream.

18. The MIMO communication device according to claim 11, wherein the power allocation circuit determines whether the subcarrier of the first symbol stream is used to transmit data by comparing a signal-to-noise ratio of the subcarrier of the first symbol stream to a predetermined threshold.

19. The MIMO communication device according to claim 11, wherein the power allocation circuit determines whether the subcarrier of the second symbol stream is used to transmit data by comparing a signal-to-noise ratio of the subcarrier of the second symbol stream to a predetermined threshold.

20. The MIMO communication device according to claim 11, further comprising:
a third symbol mapper circuit configured to receive a third data stream, perform a symbol mapping on the third data stream according to a third tone map for the plurality of subcarriers and output a third symbol stream, the third tonemap including third indicating subcarriers of the plurality of subcarriers that are not used for transmitting data, wherein
the power allocation circuitry is further configured to
determine, utilizing the third information, whether a subcarrier of the third symbol stream is used for transmitting data; and
reallocate according to the third tonemap, when the subcarrier of the third symbol stream is not used for transmitting data, the subcarrier for the first symbol stream is not used for transmitting data and the corresponding subcarrier for the second symbol stream is used for transmitting data, all of the transmit power of the subcarrier of the first symbol stream and all of the transmit power of the subcarrier of the third symbol stream to the corresponding subcarrier of the second symbol stream.

* * * * *